(12) United States Patent
Sun et al.

(10) Patent No.: US 7,940,985 B2
(45) Date of Patent: May 10, 2011

(54) SALIENT OBJECT DETECTION

(75) Inventors: Jian Sun, Beijing (CN); Tie Liu, Shaanxi (CN); Xiaoou Tang, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/759,192

(22) Filed: Jun. 6, 2007

(65) Prior Publication Data

US 2008/0304740 A1     Dec. 11, 2008

(51) Int. Cl.
*G06K 9/34* (2006.01)
(52) U.S. Cl. .................. 382/173; 382/155; 382/180
(58) Field of Classification Search .............. 382/173
See application file for complete search history.

(56) References Cited

U.S. PATENT DOCUMENTS

| | | | | |
|---|---|---|---|---|
| 5,581,637 | A * | 12/1996 | Cass et al. ............... | 382/284 |
| 5,978,507 | A | 11/1999 | Shackleton et al. | |
| 6,137,904 | A * | 10/2000 | Lubin et al. ............. | 382/162 |
| 6,282,317 | B1 | 8/2001 | Luo et al. ................ | 382/203 |
| 6,470,094 | B1 * | 10/2002 | Lienhart et al. ......... | 382/176 |
| 6,762,769 | B2 * | 7/2004 | Guo et al. ................ | 345/582 |
| 7,203,360 | B2 | 4/2007 | Lee et al. ................ | 382/173 |
| 7,212,668 | B1 | 5/2007 | Luo et al. | |
| 7,440,615 | B2 * | 10/2008 | Gong et al. ............. | 382/173 |
| 7,840,059 | B2 * | 11/2010 | Winn et al. ............. | 382/155 |
| 7,864,365 | B2 * | 1/2011 | Campbell et al. ....... | 358/1.9 |
| 2002/0081033 | A1 | 6/2002 | Stentiford | |
| 2002/0154833 | A1 * | 10/2002 | Koch et al. ............. | 382/325 |
| 2002/0164074 | A1 | 11/2002 | Matsugu et al. | |
| 2003/0026483 | A1 * | 2/2003 | Perona et al. .......... | 382/203 |
| 2005/0047647 | A1 * | 3/2005 | Rutishauser et al. ... | 382/159 |
| 2005/0084136 | A1 | 4/2005 | Xie et al. | |
| 2005/0169529 | A1 | 8/2005 | Owechko et al. | |
| 2006/0098871 | A1 * | 5/2006 | Szummer ................ | 382/173 |
| 2006/0182339 | A1 | 8/2006 | Connell | |
| 2006/0215922 | A1 * | 9/2006 | Koch et al. ............. | 382/248 |
| 2008/0075361 | A1 * | 3/2008 | Winn et al. ............. | 382/155 |
| 2008/0075367 | A1 * | 3/2008 | Winn et al. ............. | 382/180 |
| 2008/0304740 | A1 * | 12/2008 | Sun et al. ............... | 382/168 |

FOREIGN PATENT DOCUMENTS

| | | |
|---|---|---|
| JP | 08287258 | 11/1996 |
| KR | 20010036581 | 5/2001 |
| KR | 20050114817 | 12/2005 |

OTHER PUBLICATIONS

J. Lafferty, A. McCallum, and F. Pereira, "Conditional Random Fields: Probabilistic Models for Segmenting and Labeling Sequence Data", Proceedings of ICML-01 282-289 (2001).*

Chalmond, et al., "Using Hidden Scale for Salient Object Detection", available at least as early as Mar. 29, 2007, at <<http://www.cmla.ens-cachan.fr/Cmla/Publications/2004/CMLA2004-18.pdf>>, pp. 1-12.

(Continued)

*Primary Examiner* — Sath V Perungavoor
(74) *Attorney, Agent, or Firm* — Lee & Hayes, PLLC

(57) ABSTRACT

Methods for detecting a salient object in an input image are described. For this, the salient object in an image may be defined using a set of local, regional, and global features including multi-scale contrast, center-surround histogram, and color spatial distribution. These features are optimally combined through conditional random field learning. The learned conditional random field is then used to locate the salient object in the image. The methods can also use image segmentation, where the salient object is separated from the image background.

27 Claims, 11 Drawing Sheets

OTHER PUBLICATIONS

Hu, "Salient Object Extraction Combing Visual Attention and Edge Information", available at least as early as Mar. 29, 2007, at <<www.ntu.edu.sg/home5/Y030070/publications/TR-2004-02.doc>>, pp. 1-12.

Itti, et al., "A Model of Saliency-based Visual Attention for Rapid Scene Analysis", IEEE Transactions on Pattern Analysis and Machine Intelligence, 1998, v 20 No. 11, pp. 1254-1259.

Liu, "Finding important areas in images using conditional random field", available at least as early as Mar. 29, 2007, at <<http://www.cs.wisc.edu/~apirak/cs/cs838/fliu_report.pdf>>, pp. 1-7.

Walther, et al., "Selective visual attention enables learning and recognition of multiple objects in cluttered scenes", available at least as early as Mar. 29, 2007, at <<http://www.klab.caltech.edu/refweb/paper/492.pdf>>, Elsevier Inc., 2005, pp. 1-23.

* cited by examiner

802

804

SALIENT OBJECT DETECTION

BACKGROUND

In the field of image processing, visual attention refers to a process where some parts of an image receive more attention from the human brain and visual system. Many applications (i.e., computer software applications) such as automatic image cropping, adaptive image display, and image/video compression employ visual attention. Most existing visual attention approaches are based on a bottom-up computational framework that involves extraction of multiple low-level visual features in an image, such as intensity, contrast, and motion. These approaches may be effective in finding few fixation locations in images, but they have not been able to accurately detect the actual region of visual attention.

SUMMARY

This summary is provided to introduce simplified concepts of salient object detection, described below in the Detailed Description. This summary is not intended to identify essential features of the claimed subject matter, nor is it intended for use in determining the scope of the claimed subject matter.

In an embodiment, a method is performed for salient object detection where an image is received; the image includes the salient object and a background. The salient object may be defined using various feature maps which are combined. The salient object may be detected using the combined features.

BRIEF DESCRIPTION OF THE CONTENTS

The detailed description is described with reference to the accompanying figures. In the figures, the left-most digit of a component reference number identifies the particular figure in which the component first appears.

DETAILED DESCRIPTION

Systems and methods for detecting a salient object for studying visual attention in an image are described. In one implementation, the methods separate a distinctive foreground image or salient object, from the image background. To this end, the systems and methods identify the salient object in the image by describing the salient object locally, regionally, and globally using a set of visual features.

In an implementation, the visual features include multi-scale contrast, center-surround histogram, and color spatial distribution. A conditional random field learning approach is used to combine these features to detect the salient object present in the image. A large image database containing numerous carefully labeled images by multiple users is created for training the conditional random field. These and other aspects for detecting salient object in an image are now described in greater detail.

Salient Object Detection

The systems and methods for detecting a salient object in an image are described in the general context of computer-executable instructions being executed by a computing device, such as a personal computer. Computer instructions generally include routines, programs, objects, components, data structures, etc., that perform particular tasks or implement particular abstract data types. While the systems and methods are described in the foregoing context, acts and operations described hereinafter can be implemented in hardware or other forms of computing platforms.

Figure 1:
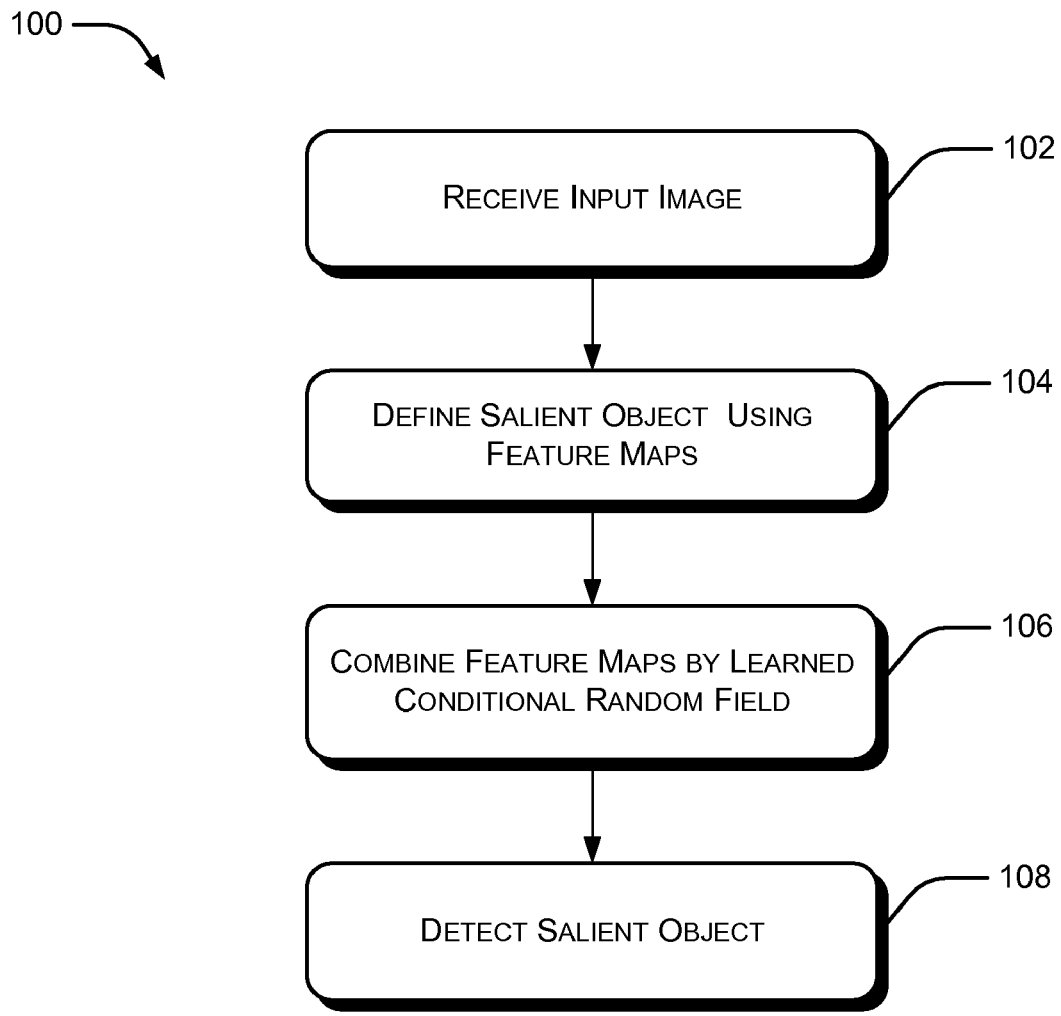
FIG. 1 shows an exemplary process for detecting a salient object in an image.

FIG. 1 shows an exemplary process 100 for salient object detection. At block 102, an input image having a distinctive foreground object or salient object and an associated background is received.

At block 104, the salient object in the image is defined using various feature maps. In an embodiment, three different feature maps may be used to define the salient object locally, regionally, and globally. For example, the local features of the salient object can be defined by a multi-scale contrast feature map, where image contrast is computed at multiple scales. The regional features of the salient object can be defined by a center-surround histogram feature map, where histogram distances with different locations and sizes are computed. The global feature of the salient object can be defined by a color-spatial variance feature map, where the global spatial distribution of a specific color is used to describe the saliency of the object.

At block 106, various feature maps are combined together by learned conditional random field (CRF). In CRF learning, an optimal linear combination of the feature maps under maximized likelihood (ML) criteria can be obtained.

At block 108, the salient object in the image is detected using the learned CRF. The detected salient object can then be used in various applications related to visual attention.

Exemplary Method for Conditional Random Field Learning

Figure 2:
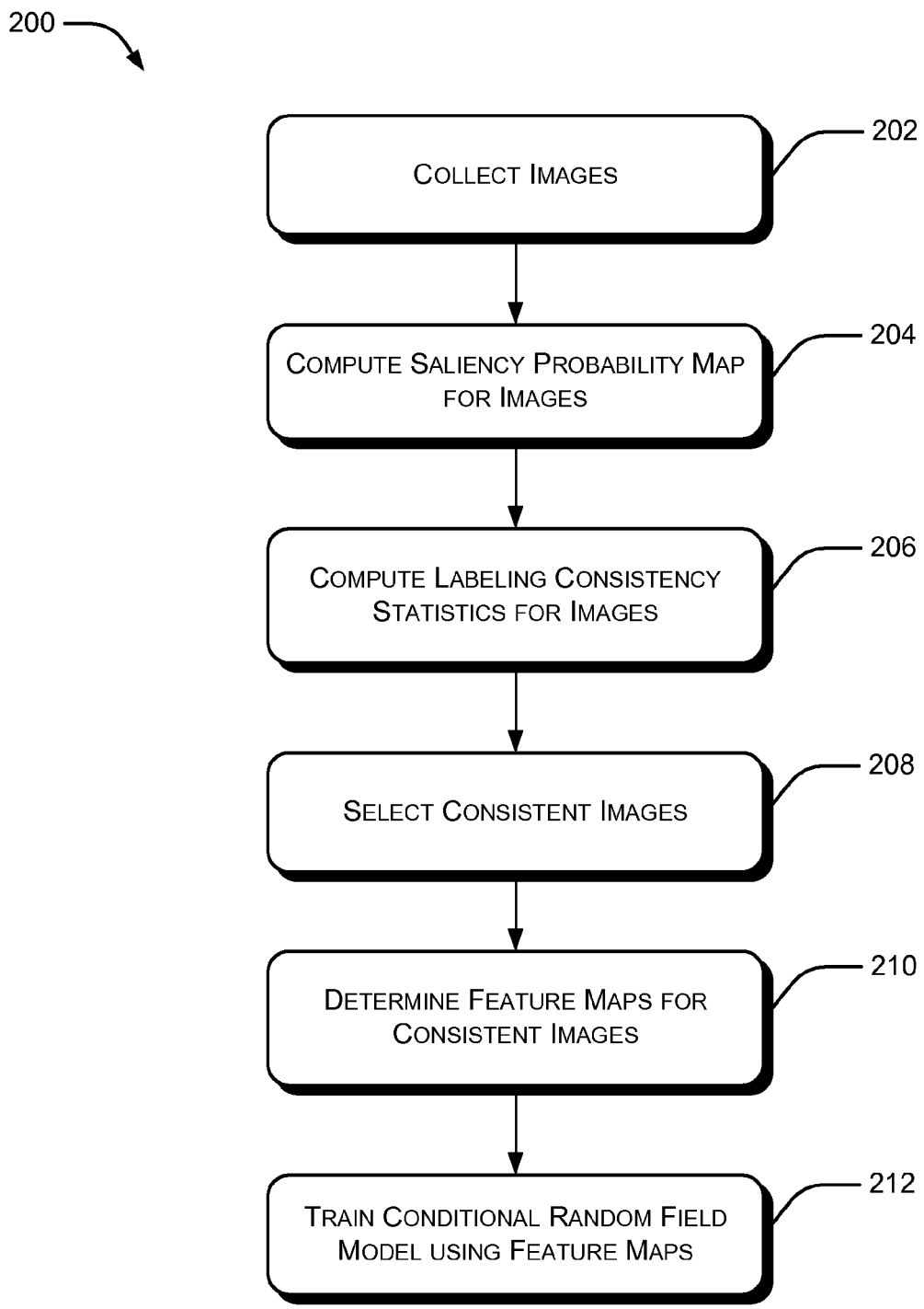
FIG. 2 shows an exemplary method for conditional random field (CRF) learning.

FIG. 2 shows an exemplary method 200 for Conditional Random Field or CRF learning. At block 202, a large number of images are collected from a variety of sources. Sources can include another image database, image forums, a personal collection of images, etc. The images can also be collected using image search engines. From the collected images, the images which include a salient object or a distinctive foreground object are selected for labeling and identification of the salient object. To evaluate salient object detection techniques, the salient object can be labeled manually by multiple users using methods such as drawing a rectangle that identifies the salient object in the image. The salient object can also be labeled by multiple users using computer-aided methods. The labeled images may form an image set $A^I$. This image set $A^I$ can be used to train and evaluate condition random fields for salient object detection.

The detection of a salient object can be formulated as a binary labeling problem in which the salient object is separated from the image background. A salient object can be represented as a binary mask $A=\{a_x\}$ in an image I. For each pixel x, $a_x \in \{1, 0\}$ is a binary label that indicates whether or not the pixel x belongs to the salient object.

At block 204, a saliency probability map, $G=\{g_x | g_x \in [0,1]\}$, of the salient object can be computed for each labeled image as:

$$g_x = \frac{1}{M} \sum_{m=1}^{M} a_x^m \quad (1)$$

where, M is the number of users involved in labeling, and $A^m = \{a_x^m\}$ is the binary mask labeled by the $m^{th}$ user.

Figure 4:
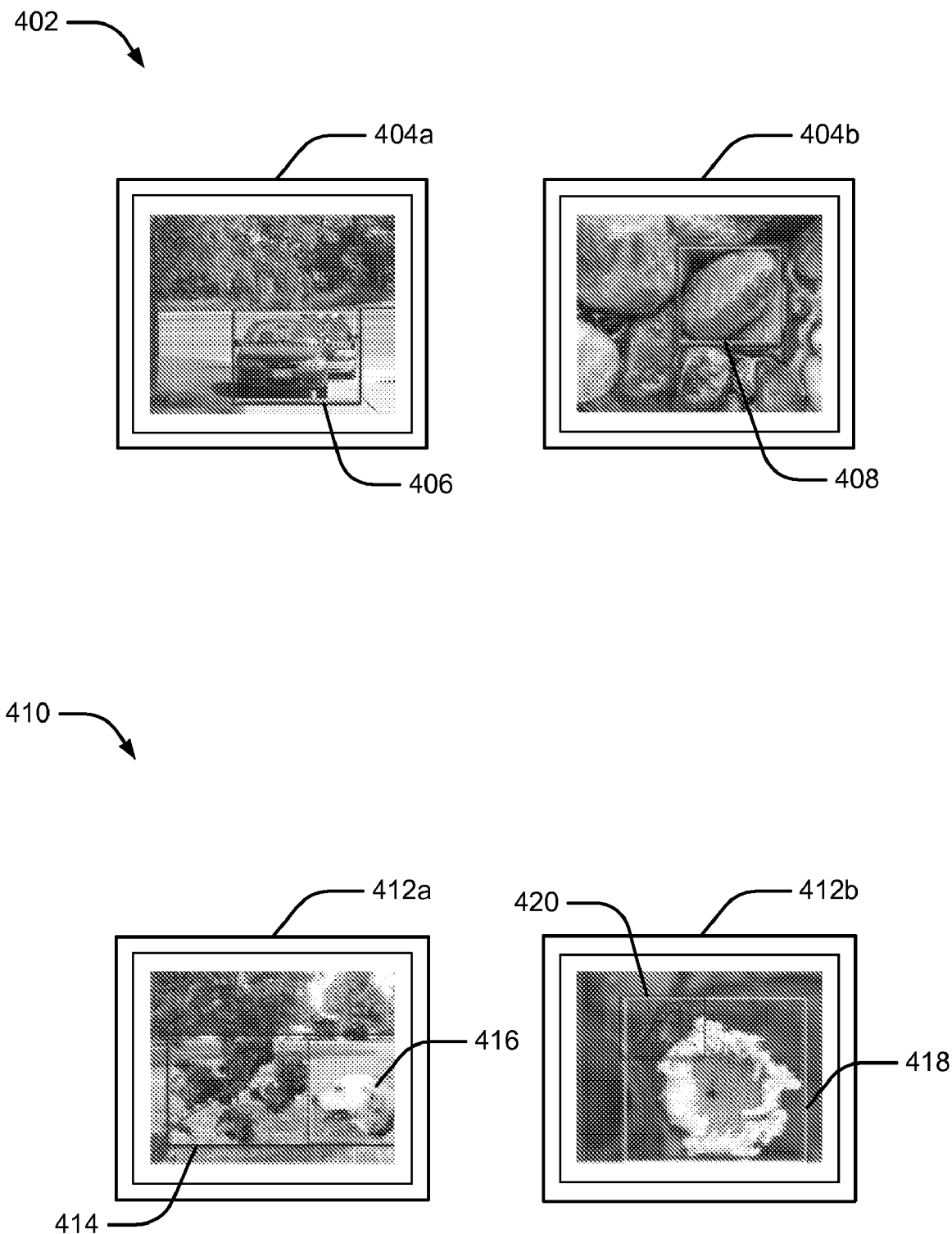
FIG. 4 shows exemplary labeled images.

At block 206, statistics for measuring labeling consistency are computed. The labeling of the images done by the multiple users may be consistent or inconsistent. Consistently labeled images are those in which a majority of the users identify a common object as the salient object. Inconsistently labeled images are those in which the multiple users may identify different objects as the salient object. Examples of consistent and inconsistent labeling are shown in FIG. 4. To measure the labeling consistency, statistics $C_t$ for each image can be computed as:

$$C_t = \frac{\sum_{x \in \{g_x > t\}} g_x}{\sum_x g_x} \quad (2)$$

where $C_t$ is the percentage of pixels whose saliency probabilities are above a given threshold t. For example, $C_{0.5}$ is the percentage of the pixels agreed on by at least half of the users. $C_{0.9} \approx 1$ indicates that the image is consistently labeled by all the users.

At block 208, a set of consistent images are selected from the image set $A^I$ based on the consistency statistics. For example, the consistent images may be the images for which $C_{0.9} > 0.8$. These consistent images form an image set $B^I$, which can be used for training conditional random fields to detect salient objects. For this, a saliency probability map G, computed for a detected salient object mask A, can be used to define or describe region-based and boundary-based measurements. For region-based measurement, Precision, Recall, and F-measure can be used to determine the accuracy of salient object detection based on a labeled salient object.

Precision and Recall indicate a ratio of a correctly detected salient region to the labeled salient region, and can be determined as follows:

$$\text{Precision} = \frac{\sum_x g_x a_x}{\sum_x a_x} \quad (3)$$

$$\text{Recall} = \frac{\sum_x g_x a_x}{\sum_x g_x} \quad (4)$$

F-measure indicates the weighted harmonic mean of precision and recall, with a non-negative constant $\alpha$ and can be determined as follows:

$$F_\alpha = \frac{(1+\alpha) \times \text{Precision} \times \text{Recall}}{\alpha \times \text{Precision} + \text{Recall}} \quad (5)$$

In one implementation, the F-measure can be used as an overall performance measurement of labeling consistency, and $\alpha$ may be set as 0.5. For the boundary-based measurement, techniques for boundary displacement error (BDE) measurement known in the art are used to measure the average displacement error of corresponding boundaries of two rectangles that identify the salient object in the image set $B^I$. The displacement of boundaries is averaged over the multiple users.

At block 210, different types of feature maps are determined for consistent images. In an implementation, three different types of feature maps are created for defining local, regional, and global features of a salient object. A multi-scale contrast feature map can be created for defining local features of the salient object, a center-surround histogram feature map can be created for defining regional features of the salient object, and a color spatial variance feature map can be created for defining global features of the salient object.

At block 212, conditional random fields are trained using the feature maps. In the Conditional Random Field or CRF model, the probability of the label $A=\{a_x\}$ in the image I is modeled as a conditional distribution $$P(A|I) = \frac{1}{Z} \exp(-E(A|I)),$$

where Z is the partition function. To detect a salient object, the energy $E(A|I)$ is defined as a linear combination of a number of K salient features $F_k(a_x, I)$ and a pairwise feature $S(a_x, a_{x'}, I)$. In one implementation, the energy $E(A|I)$ is defined as follows:

$$E(A|I) = \sum_x \sum_{k=1}^{K} \lambda_k F_k(a_x, I) + \sum_{x,x'} S(a_x, a_{x'}, I) \quad (6)$$

where, $\lambda_k$ is the weight of the $k^{th}$ feature, and x, x' are two adjacent pixels.

In equation 6 above, the salient object feature, $F_k(a_x, I)$ indicates whether or not a pixel x belongs to the salient object. Each kind of salient object feature provides a normalized feature map $f_k(x, I) \in [0, 1]$ for every pixel. The salient object feature $F_k(a_x, I)$ can be determined as:

$$F_k(a_x, I) = \begin{cases} f_k(x, I) & a_x = 0 \\ 1 - f_k(x, I) & a_x = 1 \end{cases} \quad (7)$$

Furthermore, in equation 6, the pairwise feature, $S(a_x, a_{x'}, I)$ models the spatial relationship between two adjacent pixels. $S(a_x, a_{x'}, I)$ can be determined as:

$$S(a_x, a_{x'}, I) = |a_x - a_{x'}| \cdot \exp(-\beta d_{x,x'}) \quad (8)$$

where, $d_{x,x'} = \|I_x - I_{x'}\|$ is the L2 norm of the color difference. $\beta$ is a robust parameter that weights the color contrast and can be set as $\beta = (2 \langle \|I_x - I_{x'}\|^2 \rangle)^{-1}$ in one implementation, where $\langle \cdot \rangle$ is the expectation operator. This feature function can be considered to be a penalty term when adjacent pixels are assigned with different labels. The more similar the colors of the two pixels are, the less likely they are assigned different labels. With this pairwise feature for segmentation, the homogenous interior region inside the salient object can also be labeled as salient pixels.

According to an embodiment, in CRF learning the linear weights $\vec{\lambda}=\{\lambda_k\}_{k=1}^{K}$ are estimated under maximized likelihood (ML) criteria to get an optimal linear combination of object features in the feature maps. For any N training image pairs $\{I^n, A^n\}_{n=1}^{N}$, the optimal parameters maximize the sum of the log-likelihood as follows:

$$\vec{\lambda}^* = \underset{\vec{\lambda}}{\operatorname{argmax}} \sum_n \log P(A^n | I^n; \vec{\lambda}) \quad (9)$$

The derivative of the log-likelihood with respect to the parameter $\lambda_k$ is the difference between two expectations:

$$\frac{d \log P(A^n | I^n; \vec{\lambda})}{d \lambda_k} = \quad (10)$$

$$< F_k(A^n, I^n) >_{P(A^n | I^n; \vec{\lambda})} - < F_k(A^n, I^n) >_{P(A^n | G^n)}$$

Then, the gradient descent direction is given by:

$$\Delta \lambda_k \propto \sum_n \left( \sum_{x, a_x^n} \left( \begin{array}{c} F_k(a_x^n, I^n) p(a_x^n | I^n; \vec{\lambda}) - \\ (F_k(a_x^n, I^n) p(a_x^n | g_x^n)) \end{array} \right) \right) \quad (11)$$

where, $$p(a_x^n | I^n; \vec{\lambda}) = \int_{A^n / a_x^n} P(A_x^n | I^n; \vec{\lambda})$$

is the marginal distribution and $p(a_x^n | g_x^n)$ is from the following labeled ground-truth:

$$p(a_x^n | g_x^n) = \begin{cases} 1 - g_x^n & a_x = 0 \\ g_x^n & a_x = 1 \end{cases} \quad (12)$$

In one embodiment, a pseudo-marginal belief computed by belief propagation can be used to approximate the marginal distribution. For this, a tree-reweighted belief propagation can be run in a gradient descent to compute an approximation of the marginal distribution.

Exemplary Salient Object Detection and Labeling

Figure 3:
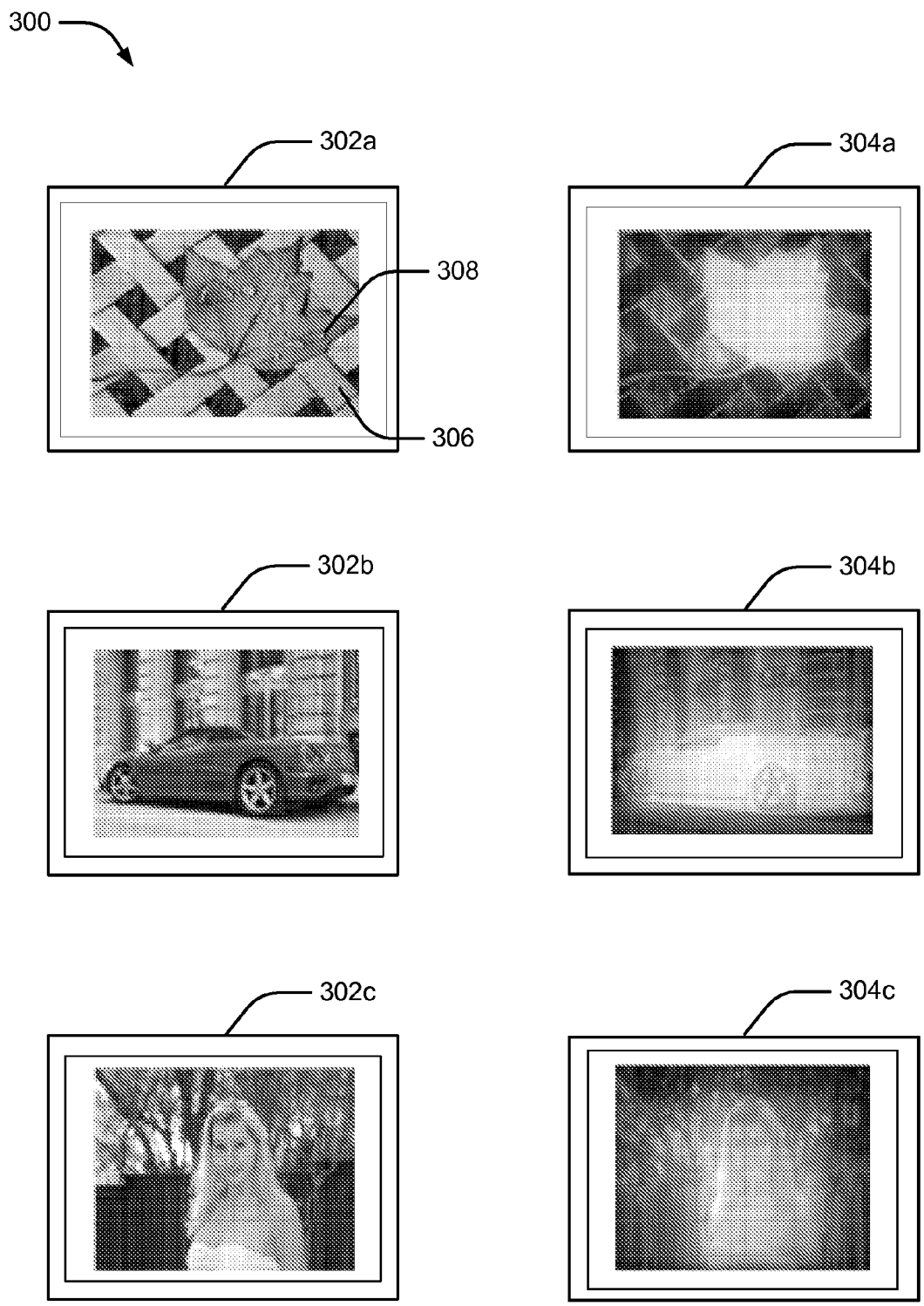
FIG. 3 shows exemplary input images and their corresponding salient objects.

FIG. 3 shows exemplary images 300 containing a salient object or a distinctive foreground object. Images 302 are the input images, and images 304 are the processed images that highlight the salient object present in each input image. For example, in image 302a, the image includes a background grid 306 and a leaf 308, the leaf 308 being the salient object. The corresponding image 304a shows detection of the leaf 308 as the salient object that attracts visual attention. Similarly, images 304b and 304c demarcate the salient objects in images 302b and 302c respectively.

FIG. 4 shows few examples of labeled images. Different users may identify different objects as a salient object in an image. For defining the most likely salient object in the image, a voting strategy can be implemented by labeling a "ground truth" salient object in the image by multiple users. For each image to be labeled, multiple users can indicate the salient object by methods such as drawing a boundary, for example a rectangle, to enclose the most likely salient object in the image. The rectangles labeled by different users may not be the same. For reducing the labeling inconsistency, a "ground truth" labeling is determined from the rectangles drawn by multiple users. Images 402 are examples of consistent images or images in which the salient object can be consistently labeled by different users. For example, in image 404a, the two cars 406 jointly form a salient object. In image 404b, the stone 408 marked in the rectangle forms the distinctive foreground object, and therefore the salient object in the image.

Images 410 are examples of inconsistent images or images in which the salient object may not be consistently labeled by different users. The inconsistency in labeling may be due to multiple disjoint foreground objects in an image. For example, in image 412a, one user may consider the plant 414 as the salient object while labeling, whereas another user may consider the dog 416 as the salient object. Similarly, in image 412b, a user may consider the flower 418 and bee 420 jointly as the salient object, while another may consider the bee 420 alone as the salient object. The inconsistent images may not be considered for conditional random field or CRF learning, as described above with respect to FIGS. 1 and 2.

Salient Object Feature Maps

Figure 5:
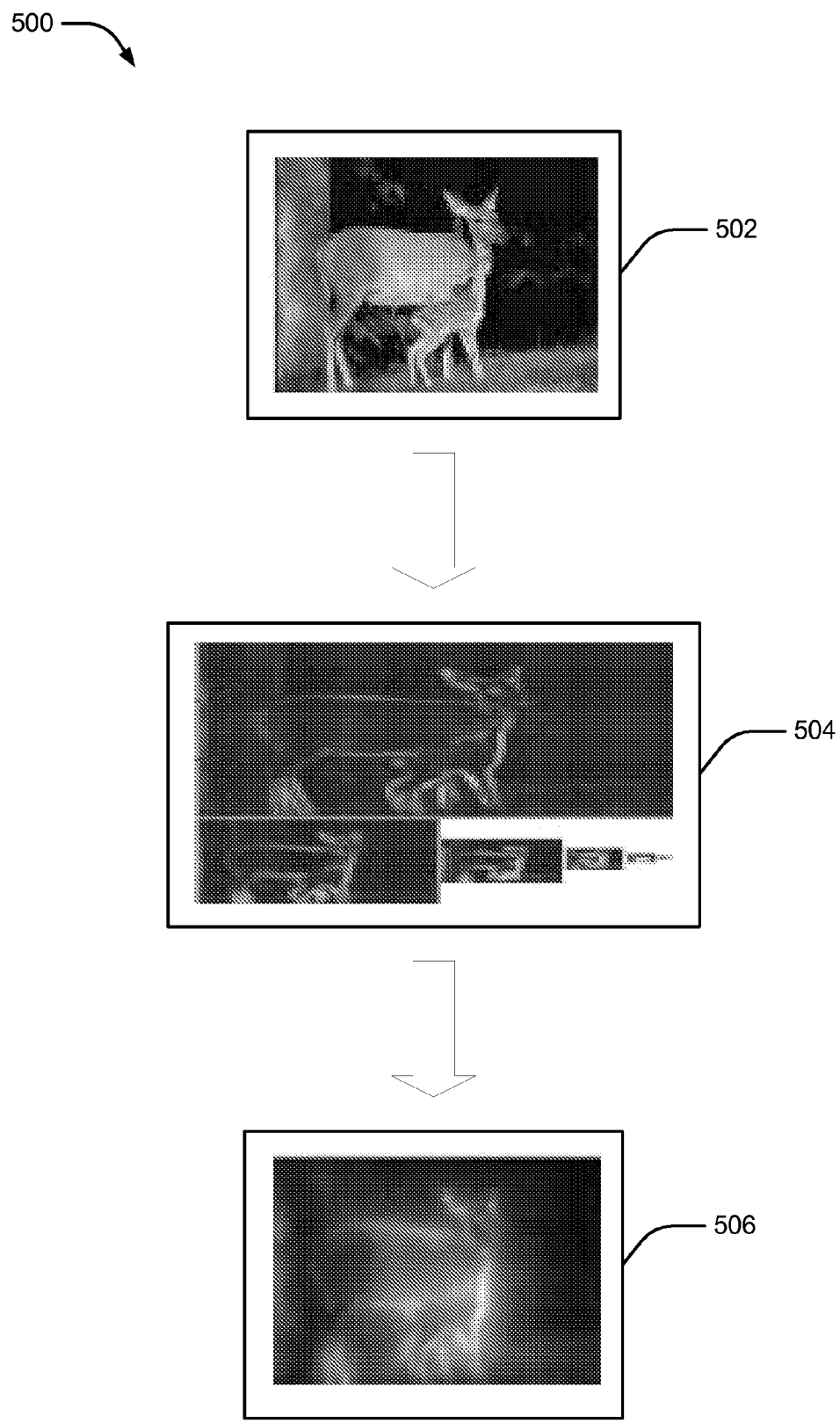
FIG. 5 shows an exemplary creation of a multi-scale contrast feature map.

FIG. 5 shows an exemplary illustration 500 of creation of a multi-scale contrast feature map. Contrast can be used as a local feature for detecting visual attention in an image because the contrast operator simulates the human visual receptive fields. Contrast can be computed at multiple scales as the size of the salient object in the image may be unknown. Multi-scale contrast highlights the high contrast boundaries by giving low scores to the homogenous regions inside the salient object. The multi-scale contrast feature $f_c(x, I)$ can be determined as a linear combination of contrasts in the Gaussian image pyramid:

$$f_c(x, I) = \sum_{l=1}^{L} \sum_{x' \in N(x)} \|I^l(x) - I^l(x')\|^2 \quad (13)$$

where, $I^l$ is the $l^{th}$ level image in the pyramid and L is the number of pyramid levels. In one implementation, L is set to 6 and N(x) is a 9×9 window. The feature map $f_c(., I)$ can be normalized to a fixed range [0, 1].

For an input image 502, multiple contrast maps can be generated at multiple scales, as shown in image 504. Image 506 shows the contrast feature map obtained from linearly combining the various contrast maps at multiple scales.

Figure 6A:
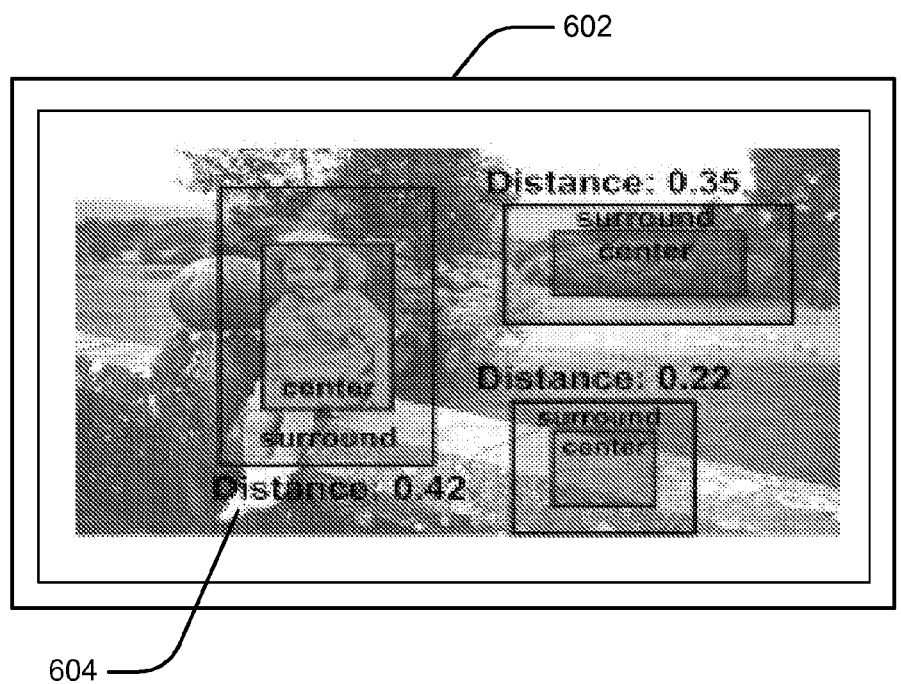
FIGS. 6a and 6b show exemplary creations of center-surround histogram feature maps.
Figure 6B:
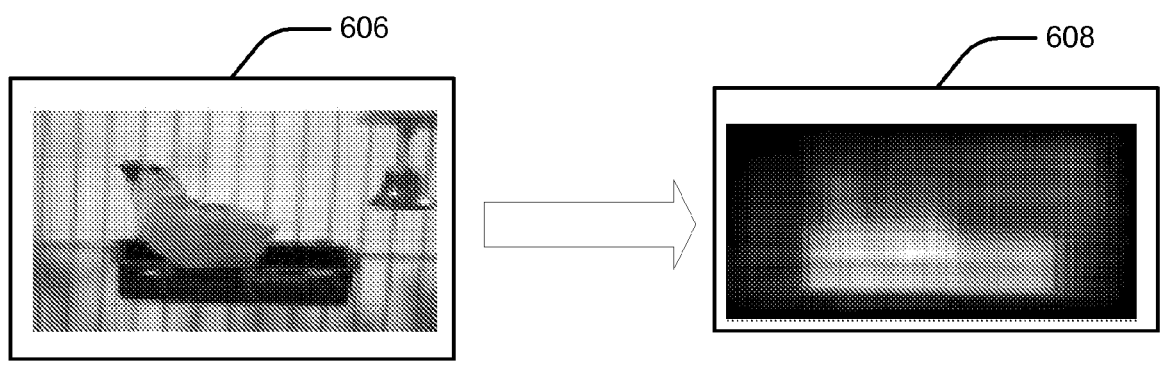

FIGS. 6a and 6b show an exemplary creation of a center-surround histogram feature map. A salient object can have a larger extent than local contrast and can thus be distinguished from its surrounding context. For this, regional salient features of an image can be defined with the use of a center-surround histogram. For example, a labeled salient object enclosed by a rectangle R, a surrounding contour $R_S$ with the same area of R is constructed, as shown in image 602 in FIG. 6a. The distinctiveness of the salient object in the rectangle with respect to its surroundings can be estimated by measuring the distance between R and $R_S$ using various visual cues such as intensity, color, and texture/texton. In an implementation, $\chi^2$ distance is used between histograms of RGB color as follows:

$$\chi^2(R, R_S) = \frac{1}{2} \sum \frac{(R^i - R_S^i)^2}{R^i + R_S^i} \quad (14)$$

Histograms can be used for global description of appearance of the image, since histograms are insensitive to small changes in size, shape, and viewpoint. The histogram of a rectangle with a location and size can be computed by means of integral histogram known in the art. For example, FIG. 6a shows that the salient object (the girl 604) is most distinct using $\chi^2$ histogram distance, as the distance measured is the highest.

In an implementation, varying aspect ratios of the object can be handled using five templates with different aspect ratios {0.5, 0.75, 1.0, 1.5, 2.0}. The most distinct rectangle R*(x) centered at each pixel x can be found by varying the size and aspect ratio:

$$R^*(x) = \underset{R(x)}{\operatorname{argmax}} \, \chi^2(R(x), R_S(x)) \quad (15)$$

In an implementation, the size range of the rectangle R(x) is set to [0.1, 0.7]×min(w, h), where w is image width and h is image height. Then, the center-surround histogram feature $f_h(x, I)$ is defined as a sum of spatially weighted distances:

$$f_h(x, I) \propto \sum_{\{x' | x \in R^*(x')\}} w_{xx'} \chi^2(R^*(x'), R_S^*(x')) \quad (16)$$

where, R*(x) is the rectangle centered at x' and containing the pixel x. The weight $w_{xx'} = \exp(-0.5\sigma_{x'}^{-2}|x-x'|^2)$ is a Gaussian falloff weight with variance $\sigma_{x'}^2$, which is set to one-third of the size of R*(x'). The feature map $f_h(\bullet, I)$ is then normalized to the range [0, 1].

FIG. 6b shows an exemplary center-surround feature map computed for an input image. 606 is the input image containing the salient object, and 608 is the corresponding center-surround histogram feature map. Thus, the salient object can be highlighted by the center-surround histogram feature.

Figure 7A:
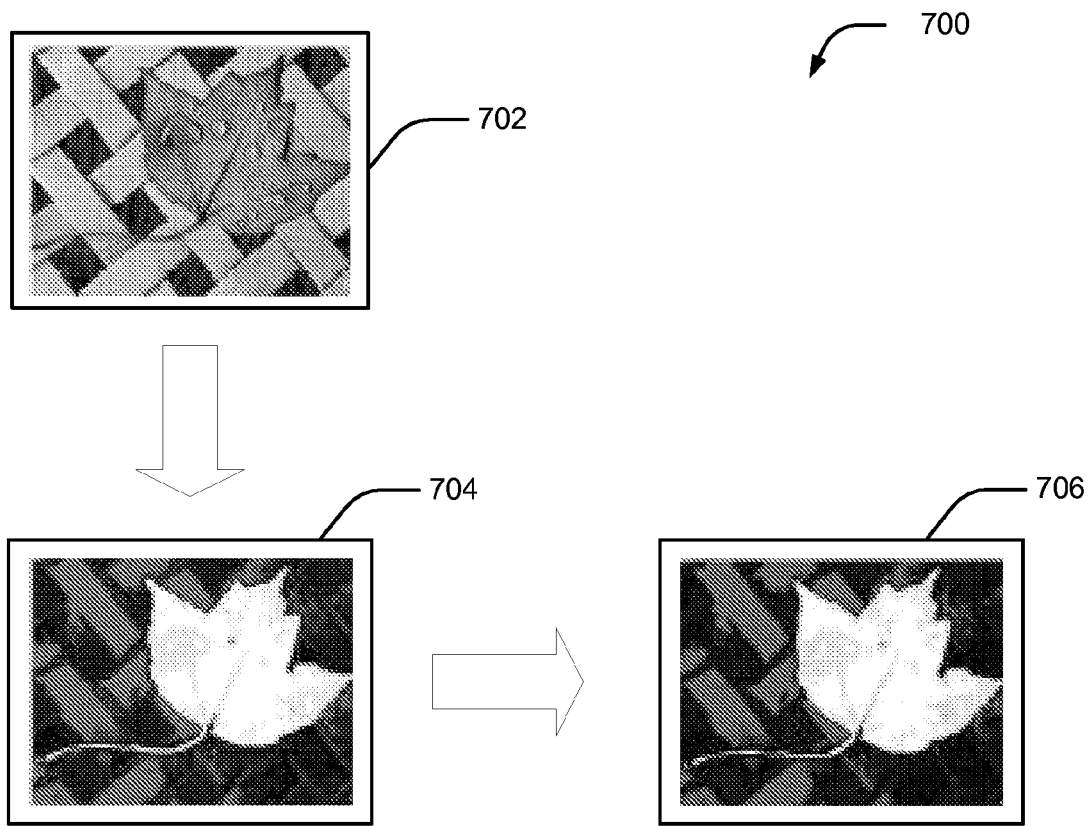
FIG. 7a shows an exemplary creation of a color spatial variance feature map.

FIG. 7a shows an exemplary illustration 700 of creation of a color spatial variance feature map. In an image, the salient object may not contain the color which is widely distributed in the image. The global spatial distribution of a specific color can be used to describe the saliency of an object in the image. The spatial-distribution of a specific color can be described by computing the spatial variance of the color. In one implementation, all colors in the image are represented by Gaussian Mixture Models (GMM) represented as $\{w_c, \mu_c, \Sigma_c\}_{c=1}^{C}$, where $\{w_c, \mu_c, \Sigma_c\}$ are respectively the weight, the mean color and the covariance matrix of the $c^{th}$ component. Each pixel can be assigned to a color component with the probability:

$$p(c | I_x) = \frac{w_c N\left(I_x | \mu_c, \sum_c\right)}{\sum_c w_c N\left(I_x | \mu_c, \sum_c\right)} \quad (17)$$

Then, the horizontal variance $V_h(c)$ of the spatial position for each color component c can be determined as:

$$V_h(c) = \frac{1}{|X|_c} \sum_x p(c | I_x) \cdot |x_h - M_h(c)|^2 \quad (18)$$

$$M_h(c) = \frac{1}{|X|_c} \sum_x p(c | I_x) x_h \quad (19)$$

where, $x_h$ is x-coordinate of the pixel x, and $|X|_c = \Sigma_x \, p(c|I_x)$. The vertical variance $V_v(c)$ can also be determined in a similar manner. The spatial variance of a component c is defined as $V(c) = V_h(c) + V_v(c)$. In an implementation, $\{V(c)\}_c$ is normalized to the range [0, 1] ($V(c) \leftarrow (V(c) - \min_c V(c))/(\max_c V(c) - \min_c V(c))$). The color spatial-distribution feature $f_s(x, I)$ can be defined as a weighted sum:

$$f_S(x, I) \propto \sum_c p(c | I_x) \cdot (1 - V(c)) \quad (20)$$

The feature map $f_s(\bullet, I)$ is also normalized to the range [0, 1].

The spatial variance of the color at the image corners or boundaries may be small if the image is cropped from the whole scene. To reduce this artifact, a center-weighted, spatial-variance feature can be determined as:

$$f_S(x, I) \propto \sum_c p(c | I_x) \cdot (1 - V(c)) \cdot (1 - D(c)) \quad (21)$$

where, $D(c) = \Sigma_x \, p(c|I_x) d_x$ is a weight which assigns less importance to colors nearby image boundaries and it is also normalized to [0, 1], similar to V(c). $d_x$ is the distance from pixel x to the image center.

In FIG. 7a, 702 is an input image, and 704 is the color spatial variance feature map of the image. Thus, the salient object can be highlighted by a color spatial variance feature map. Image 706 shows a center-weighted, color spatial variance feature map. For some images, a center-weighted, color spatial variance feature map can show a better prediction of the saliency of each color in the image.

Figure 7B:
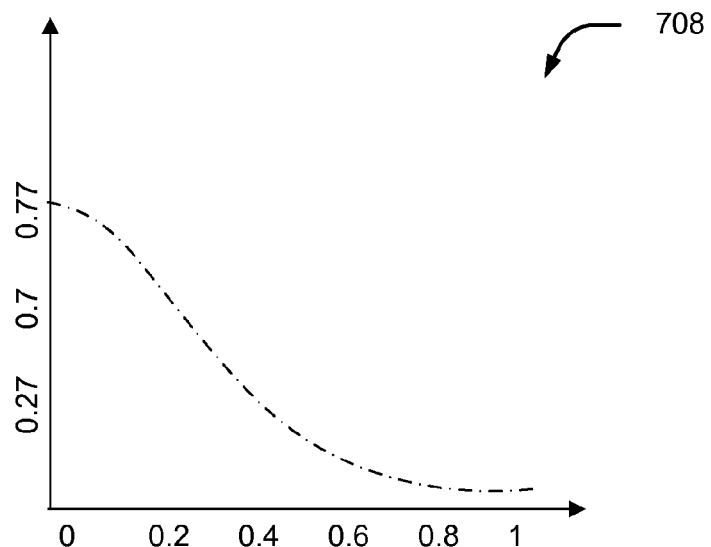
FIG. 7b shows an exemplary performance evaluation curve for spatial variance feature map.

FIG. 7b shows an exemplary performance evaluation plot 708 for spatial variance feature map. The effectiveness of color spatial variance feature on an image set, such as the image set $A^I$ can be determined by drawing a plot of the color spatial-variance on the x-coordinate versus average saliency probability on the y coordinate. The plot for image set $A^I$ is shown in FIG. 7b. It is observed that the smaller a color variance is, the higher is the probability that the color belongs to the salient object.

Condition Random Field Learning Using Feature Map Combinations

Condition random fields may be learned using different combinations of feature maps, as discussed above with respect to FIG. 2. In an implementation, to evaluate the effectiveness of individual features, four CRFs are trained, such that three CRFs are trained with individual features and one CRF is trained with all three features.

Figure 8:
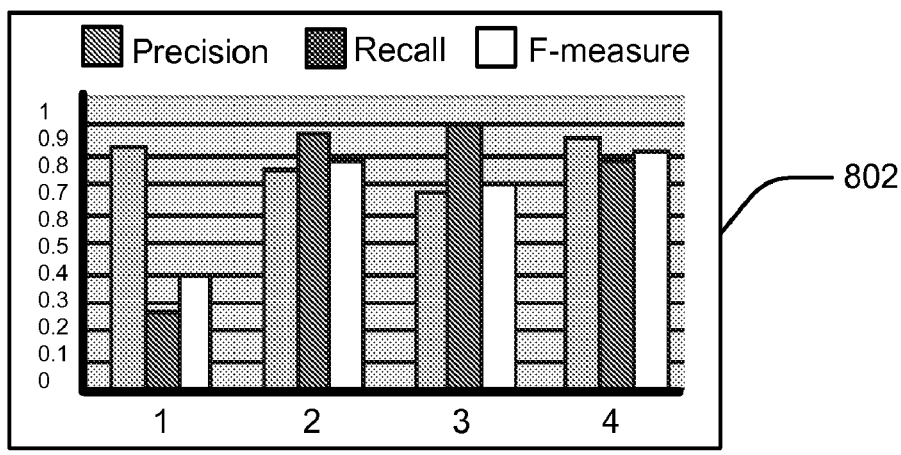
FIG. 8 shows exemplary performance evaluation graphs for conditional random field learned from individual feature maps and a combination of the feature maps.
Figure 8:
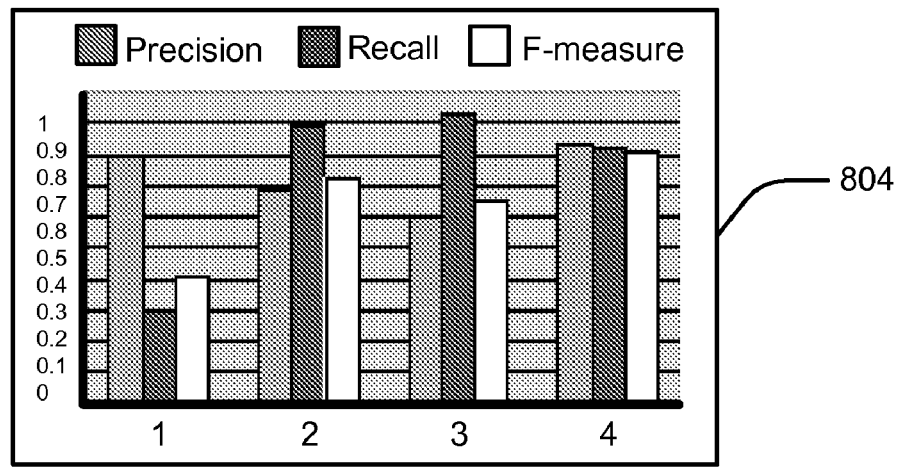

FIG. 8 shows evaluation graphs of salient object feature maps for this implementation. The graphs show the precision, recall, and F-measure of the four CRFs on the image sets AI and BI.

Graph 802 shows evaluation of image set AI and graph 804 shows evaluation of image set BI. The horizontal axis is marked with numbers 1, 2, 3 and 4, where 1 refers to salient object detection by CRF learned from multi-scale contrast feature map, 2 refers to salient object detection by CRF learned from center-surround histogram feature map, 3 refers to salient object detection by CRF learned from color spatial distribution feature map, and 4 refers to CRF learned from a combination of all the three features.

In this example, as seen from graphs 802 and 804, the multi-scale contrast feature has a high precision but a very low recall. This may be because the inner homogenous region of a salient object has low contrast. The center-surround histogram has the best overall performance (on F-measure) among all individual features. This may be because the regional feature is able to detect the whole salient object, although the background region may contain some errors. The color spatial distribution has slightly lower precision but has the highest recall. Furthermore, in this example, after linearly combining all the three features by CRF learning, the CRF with all three features is found to produce the best overall result, as shown in the last bars in FIG. 8. In one implementation, the best linear weights learnt by the CRF method combining the three feature maps, i.e. multi-scale contrast, center-surround histogram and color spatial distribution, are: $\vec{\lambda} = \{0.24, 0.54, 0.22\}$ refers to CRF learned from a combination of all the three features.

Multiple Salient Object Detection

Figure 9:
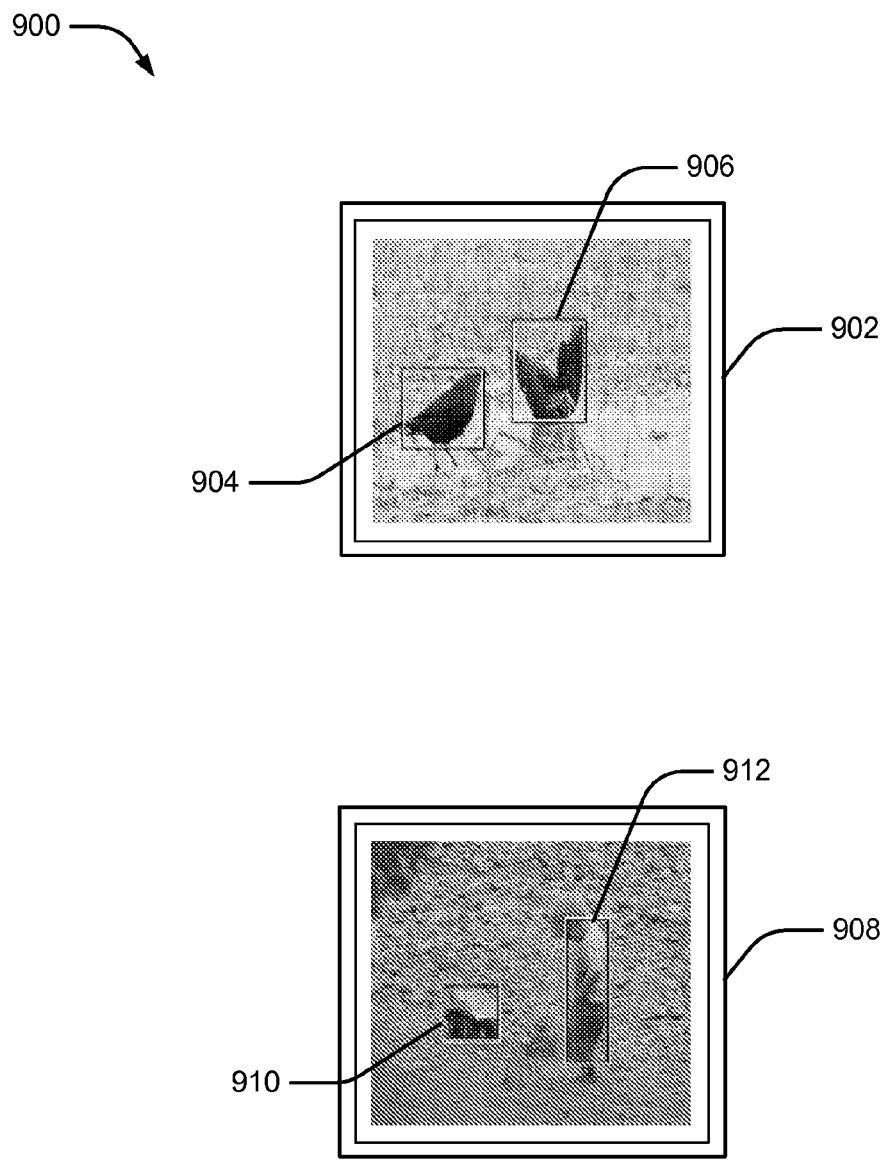
FIG. 9 shows exemplary images for describing a method for detecting multiple salient objects.

FIG. 9 shows exemplary images 900 containing multiple salient objects. The methods for single salient object detection as described above can also be extended to detect multiple salient objects. The CRF method can also output two disjoint connected components so that both the objects can be detected simultaneously as salient objects. In image 902, both the birds 904 and 906 are detected at the same time. The inhibition of return strategy, as known in the art, can also be used along with the CRF learning method as described above to detect the salient objects one-by-one. For example, in image 904, the toy car 910 can be detected first, and using the updated feature maps, the boy 912 can then be detected.

Exemplary Procedure

Figure 10:
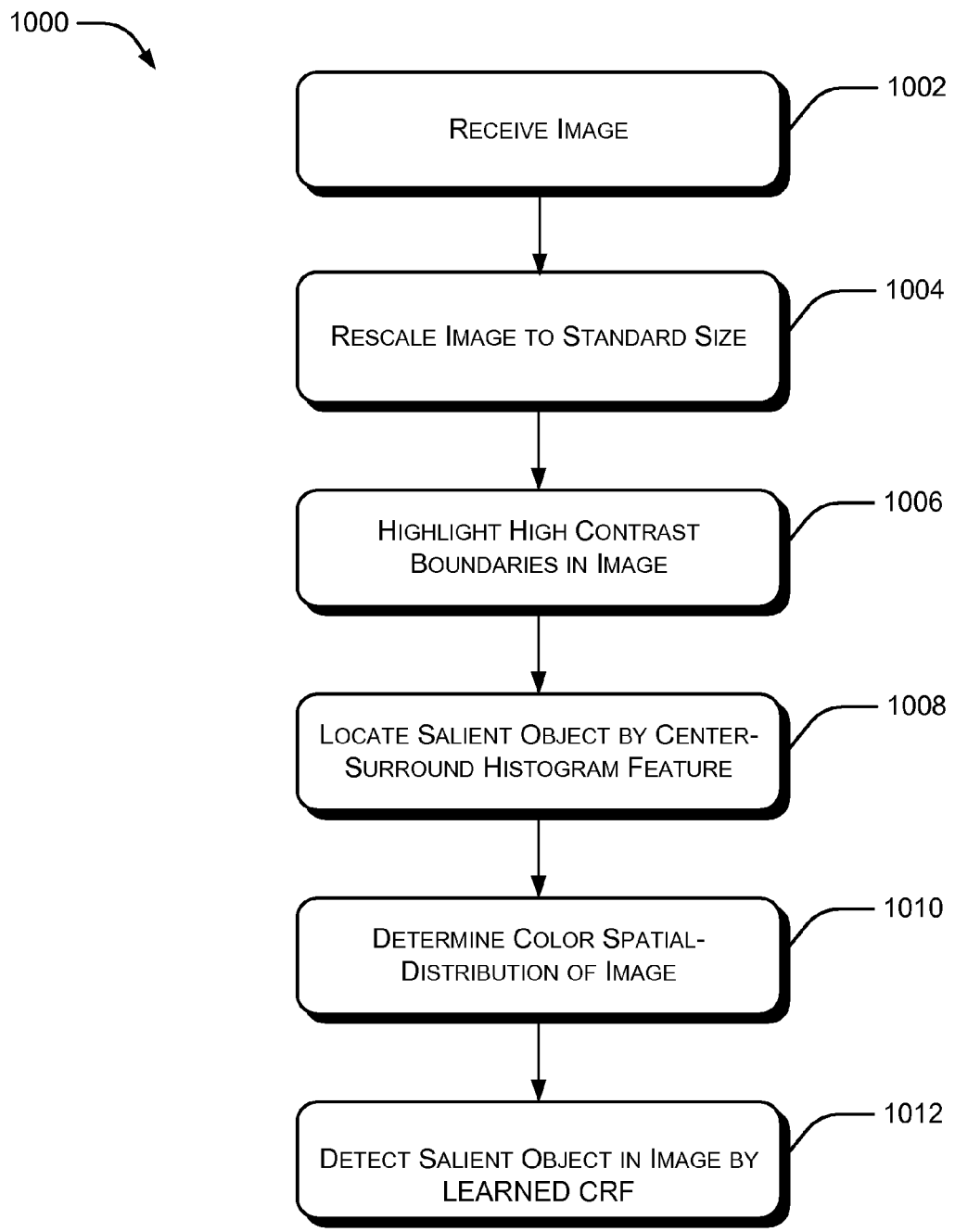
FIG. 10 shows an exemplary process for detecting a salient object using three feature maps.

FIG. 10 shows an exemplary process of detecting a salient object using the three feature maps (i.e., multi-scale contrast, center-surround histogram and color spatial distribution). Process 1000 is illustrated as a collection of blocks in a logical flow graph representing a sequence of operations that can be implemented in hardware, software, firmware or a combination thereof. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. In the context of software, the blocks represent computer instructions that, when executed by one or more processors, perform the recited operation.

At block 1002, an image is received that contains a salient object or a distinctive foreground object. The receiving may be performed as part of a software application on a computing device.

At block 1004, the image is rescaled to a standard size. In an implementation, the image is resized so that the Max (width, height) of the image is 400 pixels, which can be used to set parameters while creating feature maps.

At block 1006, local features of the image are defined with the use of a multi-scale contrast feature map. The high contrast boundaries of the image are highlighted as explained with reference to FIG. 5 above.

At block 1008, regional features of the image are defined with the use of a center-surround histogram feature map, as explained with reference to FIGS. 6a and 6b above. The center-surround histogram gives an estimate of distinctiveness between the salient object and its surroundings in the image.

At block 1010, global features of the image are defined with the use of a color spatial distribution feature map, as described with reference to FIG. 7a above. The global spatial distribution of a specific color can be used to describe the probability of saliency of an object.

At block 1012, the salient object in the image is detected by learned CRF, as described with reference to FIG. 2 above. In CRF learning, an optimal linear combination of all the three feature maps can be obtained using labeled training images. Then, the leaned CRF is used to detect a salient object with an unknown size and shape recited operation.

The above procedure for implementation has been described with respect to one embodiment of the system. It can be appreciated that the process can be implemented by other embodiments as well.

Exemplary Computing Environment

Figure 11:
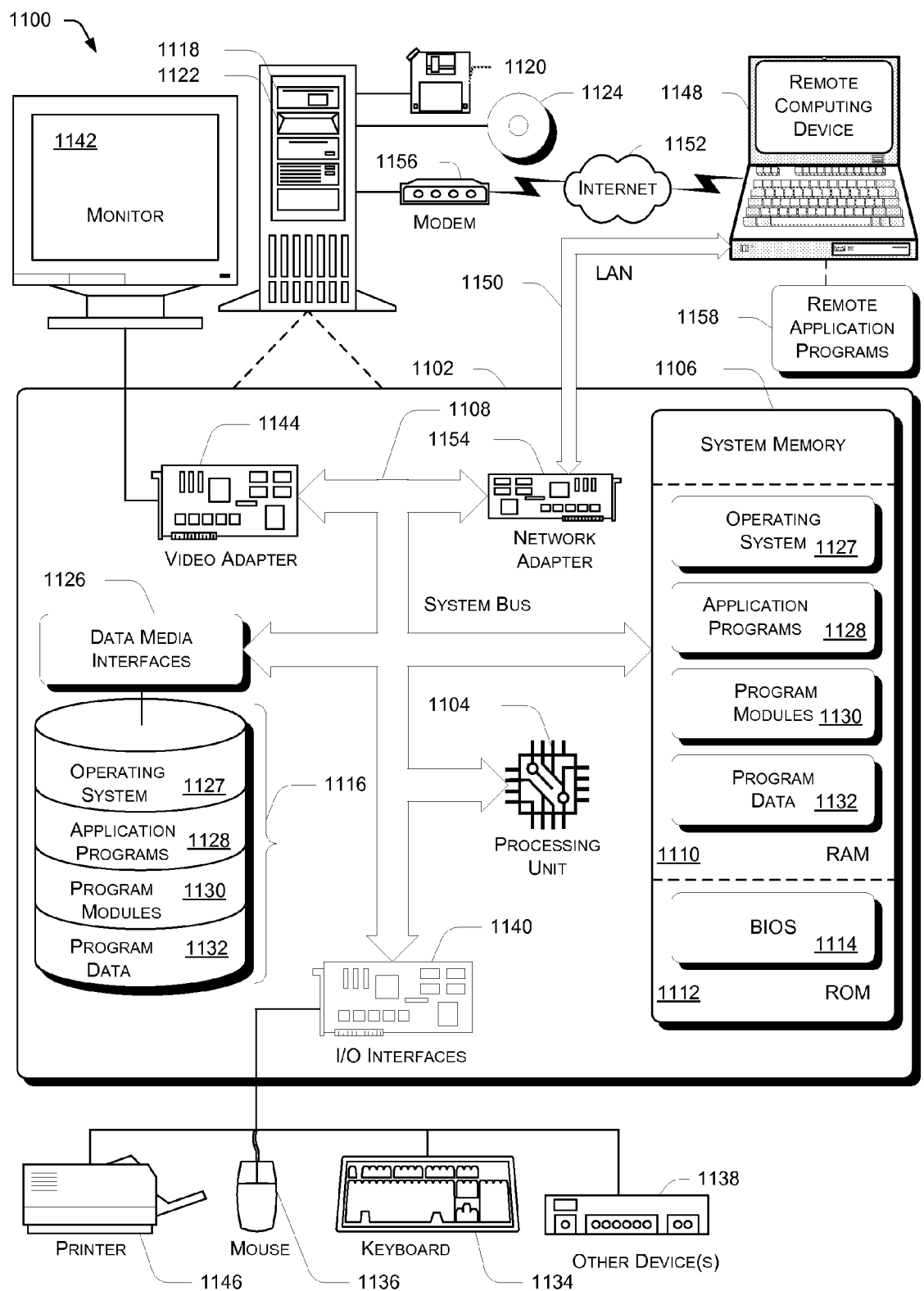
FIG. 11 shows an exemplary computing environment.

FIG. 11 illustrates an exemplary general computer environment 1100, which can be used to implement the techniques described herein, and which may be representative, in whole or in part, of elements described herein. The computer environment 1100 is only one example of a computing environment and is not intended to suggest any limitation as to the scope of use or functionality of the computer and network architectures. Neither should the computer environment 1100 be interpreted as having any dependency or requirement relating to any one or combination of components illustrated in the example computer environment 1100.

Computer environment 1100 includes a general-purpose computing-based device in the form of a computer 1102. Computer 1102 can be, for example, a desktop computer, a handheld computer, a notebook or laptop computer, a server computer, a game console, and so on. The components of computer 1102 can include, but are not limited to, one or more processors or processing units 1104, a system memory 1106, and a system bus 1108 that couples various system components including the processor 1104 to the system memory 1106.

The system bus 1108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1102 typically includes a variety of computer readable media. Such media can be any available media that is accessible by computer 1102 and includes both volatile and non-volatile media, removable and non-removable media.

The system memory 1106 includes computer readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 may also include other removable/non-removable, volatile/non-volatile computer storage media. By way of example, FIG. 6 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1126. Alternately, the hard disk drive 1116, magnetic disk drive 1118, and optical disk drive 1122 can be connected to the system bus 1108 by one or more interfaces (not shown).

The disk drives and their associated computer-readable media provide non-volatile storage of computer readable instructions, data structures, program modules, and other data for computer 1102. Although the example illustrates a hard disk 1116, a removable magnetic disk 1120, and a removable optical disk 1124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1116, magnetic disk 1120, optical disk 1124, ROM 1112, and/or RAM 1110, including by way of example, an operating system 1127, one or more application programs 1128, other program modules 1130, and program data 1132. Each of such operating system 1127, one or more application programs 1128, other program modules 1130, and program data 1132 (or some combination thereof) may implement all or part of the resident components that support the distributed file system.

A user can enter commands and information into computer 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device can also be connected to the system bus 1108 via an interface, such as a video adapter 1144. In addition to the monitor 1142, other output peripheral devices can include components such as speakers (not shown) and a printer 1146 which can be connected to computer 1102 via the input/output interfaces 1140.

Computer 1102 can operate in a networked environment using logical connections to one or more remote computers, such as a remote computing-based device 1148. By way of example, the remote computing-based device 1148 can be a personal computer, portable computer, a server, a router, a network computer, a peer device or other common network node, and the like. The remote computing-based device 1148 is illustrated as a portable computer that can include many or all of the elements and features described herein relative to computer 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet.

When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which can be internal or external to computer 1102, can be connected to the system bus 1108 via the input/output interfaces 1140 or other appropriate mechanisms. It is to be appreciated that the illustrated network connections are exemplary and that other means of establishing communication link(s) between the computers 1102 and 1148 can be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components such as the operating system are illustrated herein as discrete blocks, although it is recognized that such programs and components reside at various times in different storage components of the computing-based device 1102, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework

CONCLUSION

The above described systems and methods describe salient object detection. Although the systems and methods have been described in language specific to structural features and/or methodological operations or actions, it is understood that the implementations defined in the appended claims are not necessarily limited to the specific features or actions described. Rather, the specific features and operations of are disclosed as exemplary forms of implementing the claimed subject matter.

What is claimed is:

1. A method for salient object detection in an image comprising:
   receiving the image that includes the salient object and a background;
   defining the salient object using various feature maps;
   combining the various feature maps of the salient object, wherein the feature maps define the salient object locally, regionally, and globally that includes conditional random field learning that comprises:
      collecting a number of images of salient objects, from a variety of sources, wherein each of the images are labeled;
      computing a saliency probability map for each of the images;
      computing labeling consistency statistics for each of the images;
      selecting consistent images from the labeled images;
      determining feature maps for selected consistent images; and
      training conditional random fields for the conditional random field learning, using the feature maps; and
   detecting the salient object using the combined feature maps.

2. The method of claim 1, wherein the feature map that defines the salient object locally is defined by a multi-scale contrast feature map.

3. The method of claim 1, wherein the feature map that defines the salient object regionally is defined by a center-surround histogram feature map.

4. The method of claim 1, wherein the feature map that defines the salient object globally is defined by a color-spatial variance feature map.

5. The method of claim 1, wherein an optimal linear combination of the feature maps is obtained under a maximized linear criteria through the conditional random field learning.

6. The method of claim 1, wherein the collecting is from one or more of the following sources: an image database, an image forum, and a personal collection.

7. The method of claim 1, wherein the collecting is perform using an image search engine.

8. The method of claim 1, wherein the images are labeled by multiple users, identifying a salient object in the image.

9. The method of claim 1, wherein the computing the saliency probability map is defined as $G=\{g_x/g_x \in [0,1]\}$, and the salient object is computed for each label images by the following equation:

$$g_x = \frac{1}{M}\sum_{m=1}^{M} a_x^m.$$

10. The method of claim 1, wherein the computing labeling consistency statistics is defined by $C_t$ for each image, and computes by the following equations:

$$C_t = \frac{\sum_{x \in \{g_x > t\}} g_x}{\sum_x g_x}.$$

11. The method of claim 10, wherein region-based measurement uses precision, recall, and F-measure to determine the accuracy of a salient object.

12. The method of claim 10, wherein boundary-based measurement measure an average displacement error of corresponding boundaries of two rectangles that identify the salient object in an image set.

13. The method of claim 1, wherein the selecting includes region-based and boundary-based measurements.

14. The method of claim 1, wherein the determining feature maps includes creating feature maps that define local, global, and global features of a salient object.

15. The method of claim 1, wherein the training conditional random fields uses a conditional random field model wherein probability of a label $A=\{a_x\}$ in an image I is modeled as a conditional distribution $$P(A|I) = \frac{1}{Z}\exp(-E(A|I)),$$

where Z is a partition function, and E(A|I) is defined as a linear combination of a number of K salient features $F_k(a_x, I)$ and a pairwise feature $S(a_x, a_{x'}, I)$, E(A|I) is defined by the following equation:

$$E(A|I) = \sum_x \sum_{k=1}^{K} \lambda_k F_k(a_x, I) + \sum_{x,x'} S(a_x, a_{x'}, I).$$

16. A method for salient object detection in an image comprising:
   receiving the image that includes the salient object;
   rescaling the image to standard size;
   defining local, regional, and global features of the image; and
   detecting the salient object by learned conditional random field, comprised of
      collecting a number of images of salient objects, from a variety of sources, wherein each of the images are labeled;
      computing a saliency probability map for each of the images;
      computing labeling consistency statistics for each of the images;
      selecting consistent images from the labeled images;
      determining feature maps for selected consistent images, wherein the feature maps define the salient object locally, regionally, and globally; and
      training conditional random fields for the conditional random field learning, using the feature maps.

17. The method of claim 16, wherein the defining local features of the image uses a multi-scale contrast feature map, regional features of the image uses a center-surround histogram feature map, and global features of the image uses a color spatial feature map.

18. The method of claim 16, wherein the collecting is from one or more of the following sources: an image database, an image forum, and a personal collection.

19. The method of claim 16, wherein the collecting is perform using an image search engine.

20. The method of claim 16, wherein the images are labeled by multiple users, identifying a salient object in the image.

21. The method of claim 16, wherein the computing the saliency probability map is defined as $G=\{g_x|g_x \in [0,1]\}$, and the salient object is computed for each label images by the following equation:

$$g_x = \frac{1}{M}\sum_{m=1}^{M} a_x^m.$$

22. The method of claim 16, wherein the computing labeling consistency statistics is defined by $C_t$ for each image, and computes by the following equations:

$$C_t = \frac{\sum_{x \in \{g_x > t\}} g_x}{\sum_x g_x}.$$

23. The method of claim 22, wherein region-based measurement uses precision, recall, and F-measure to determine the accuracy of a salient object.

24. The method of claim 22, wherein boundary-based measurement measure an average displacement error of corresponding boundaries of two rectangles that identify the salient object in an image set.

25. The method of claim 16, wherein the selecting includes region-based and boundary-based measurements.

26. The method of claim 16, wherein the determining feature maps includes creating feature maps that define local, global, and global features of a salient object.

27. The method of claim 16, wherein the training conditional random fields uses a conditional random field model wherein probability of a label $A=\{a_x\}$ in an image I is modeled as a conditional distribution $P(A|I)=$ $$\frac{1}{Z}\exp(-E(A|I)),$$

where Z is a partition function, and E(A|I) is defined as a linear combination of a number of K salient features $F_k(a_x, I)$ and a pairwise feature $S(a_x, a_{x'}, I)$, E(A|I) is defined by the following equation:

$$E(A|I) = \sum_x \sum_{k=1}^{K} \lambda_k F_k(a_x, I) + \sum_{x,x'} S(a_x, a_{x'}, I).$$

* * * * *